(12) United States Patent
Shariff et al.

(10) Patent No.: US 11,274,501 B2
(45) Date of Patent: Mar. 15, 2022

(54) FLOW MANAGEMENT SYSTEMS AND RELATED METHODS FOR OIL AND GAS APPLICATIONS

(71) Applicant: Saudi Arabian Oil Company, Dhahran (SA)

(72) Inventors: Maher Maqbool Shariff, Dhahran (SA); Taras Yurievich Makogon, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 140 days.

(21) Appl. No.: 16/923,631

(22) Filed: Jul. 8, 2020

(65) Prior Publication Data
US 2022/0010628 A1   Jan. 13, 2022

(51) Int. Cl.
   *B08B 9/027*   (2006.01)
   *E21B 17/00*   (2006.01)
   *E21B 33/128*  (2006.01)
   *E21B 33/127*  (2006.01)

(52) U.S. Cl.
   CPC ............ *E21B 17/006* (2013.01); *B08B 9/027* (2013.01); *E21B 33/128* (2013.01); *E21B 33/1277* (2013.01); *E21B 2200/09* (2020.05); *Y10T 137/0435* (2015.04)

(58) Field of Classification Search
   CPC ... B08B 9/027; E21B 33/1277; E21B 33/128; E21B 2200/09; Y10T 137/0435
   See application file for complete search history.

(56) References Cited

U.S. PATENT DOCUMENTS

| | | | |
|---|---|---|---|
| 362,368 | A | 5/1887 | Dikeman |
| 2,390,093 | A | 12/1945 | Ed |
| 3,623,684 | A | 11/1971 | Kline |
| 4,596,586 | A | 6/1986 | Davies et al. |
| 5,619,611 | A | 4/1997 | Loschen et al. |

(Continued)

FOREIGN PATENT DOCUMENTS

| | | |
|---|---|---|
| AU | 2009202232 | 10/2013 |
| CA | 1304286 | 6/1992 |

(Continued)

OTHER PUBLICATIONS

Trofaier et al., "Optimizing Separation Efficiency Of Produced Water Tanks By Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.

(Continued)

*Primary Examiner* — Sharidan Carrillo
(74) *Attorney, Agent, or Firm* — Fish & Richardson P.C.

(57) ABSTRACT

A method of managing a fluid flow within a conduit includes determining a presence of a flow blockage within the conduit, the conduit being equipped with an expandable device, controlling an electric actuator to flow a current to the expandable device to expand the expandable device radially, compacting the flow blockage radially along a length of the expandable device to create a channel adjacent the flow blockage, controlling the electric actuator to terminate a flow of the current to the expandable device to collapse the expandable device radially, and exposing the channel to open the conduit to fluid flow.

20 Claims, 10 Drawing Sheets

(56) References Cited

U.S. PATENT DOCUMENTS

| | | | |
|---|---|---|---|
| 5,981,447 | A | 11/1999 | Chang et al. |
| 6,093,869 | A | 7/2000 | Roe et al. |
| 6,307,191 | B1 | 10/2001 | Waycuilis |
| 6,343,652 | B1 | 2/2002 | Corre et al. |
| 6,843,832 | B2 | 1/2005 | Greene et al. |
| 6,854,522 | B2 | 2/2005 | Brezinski et al. |
| 6,939,082 | B1 | 9/2005 | Baugh |
| 7,107,706 | B1 | 9/2006 | Bailey et al. |
| 7,279,052 | B2 | 10/2007 | Kinnari et al. |
| 8,003,573 | B2 | 8/2011 | Ballard et al. |
| 8,337,603 | B2 | 12/2012 | Akhras et al. |
| 8,425,549 | B2 | 4/2013 | Lenker et al. |
| 8,869,880 | B2 | 10/2014 | McClanahan et al. |
| 9,157,290 | B2 | 10/2015 | Habesland et al. |
| 9,759,025 | B2 | 9/2017 | Vavik |
| 9,828,847 | B2 | 11/2017 | Vavik |
| 9,833,727 | B1 | 12/2017 | Ball, IV |
| 10,301,912 | B2 | 5/2019 | De Witt et al. |
| 2001/0015213 | A1 | 8/2001 | Clarke |
| 2005/0087231 | A1* | 4/2005 | Sanders ................ F16K 31/001 137/489.5 |
| 2005/0205261 | A1 | 9/2005 | Andersen et al. |
| 2007/0277967 | A1 | 12/2007 | Oserod |
| 2009/0205675 | A1 | 8/2009 | Sarkar |
| 2010/0236785 | A1 | 9/2010 | Collis et al. |
| 2012/0263606 | A1* | 10/2012 | Bouldin ................ E21B 43/128 417/54 |
| 2013/0048295 | A1 | 2/2013 | Beynet et al. |
| 2013/0186477 | A1* | 7/2013 | Mainzer ................ F16L 55/124 137/15.01 |
| 2018/0065753 | A1 | 3/2018 | Schwichtenberg et al. |
| 2018/0192476 | A1 | 7/2018 | Chaudhry et al. |
| 2019/0145582 | A1 | 5/2019 | Hesketh-Prichard et al. |
| 2020/0080386 | A1 | 3/2020 | Yang et al. |

FOREIGN PATENT DOCUMENTS

| | | |
|---|---|---|
| CN | 110185415 | 8/2019 |
| EP | 2372424 | 10/2011 |
| EP | 2299585 | 7/2013 |
| JP | 5143324 | 2/2013 |
| KR | 850001746 | 12/1985 |
| KR | 950003920 | 4/1995 |
| KR | 0132212 | 4/1998 |
| KR | 20150000297 | 1/2015 |
| WO | WO 2010139943 | 12/2010 |
| WO | WO 2021119113 | 6/2021 |

OTHER PUBLICATIONS

PCT International Search Report and Written Opinion in International Appln. No. PCT/US2021/040821, dated Oct. 5, 2021, 14 pages.

PCT International Search Report and Written Opinion in International Appln. No. PCT/US2021/040827, dated Oct. 7, 2021, 14 pages.

* cited by examiner

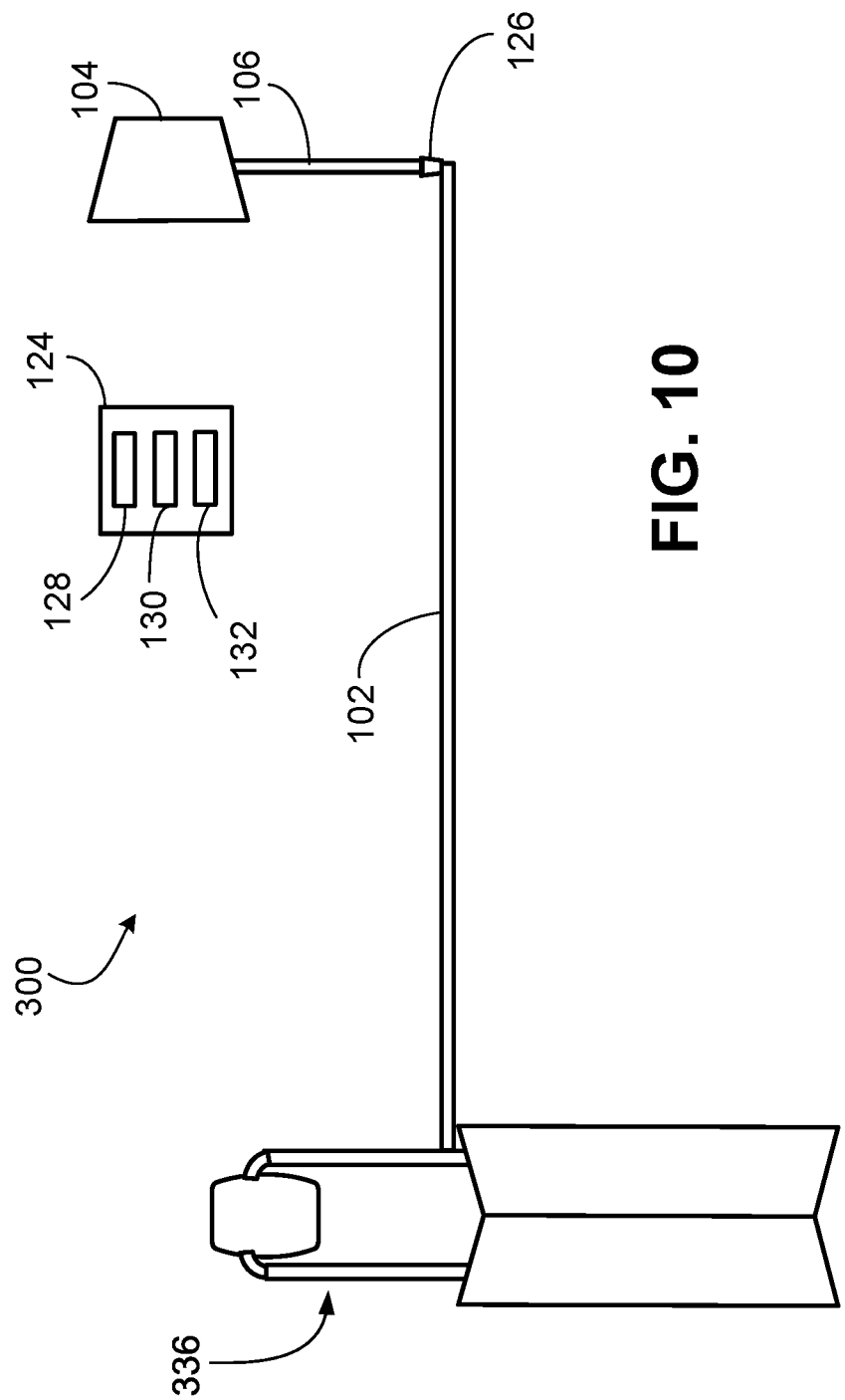

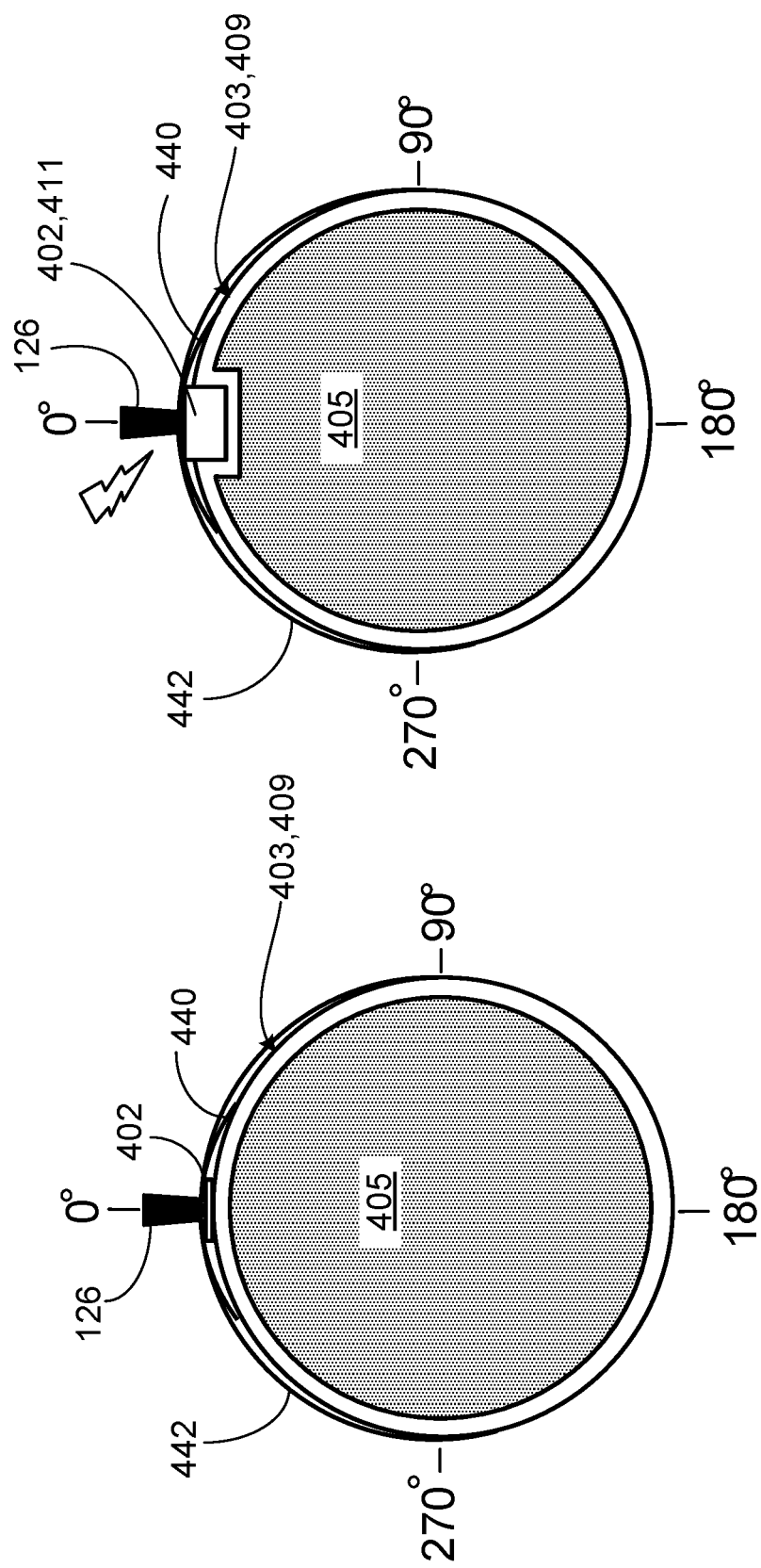

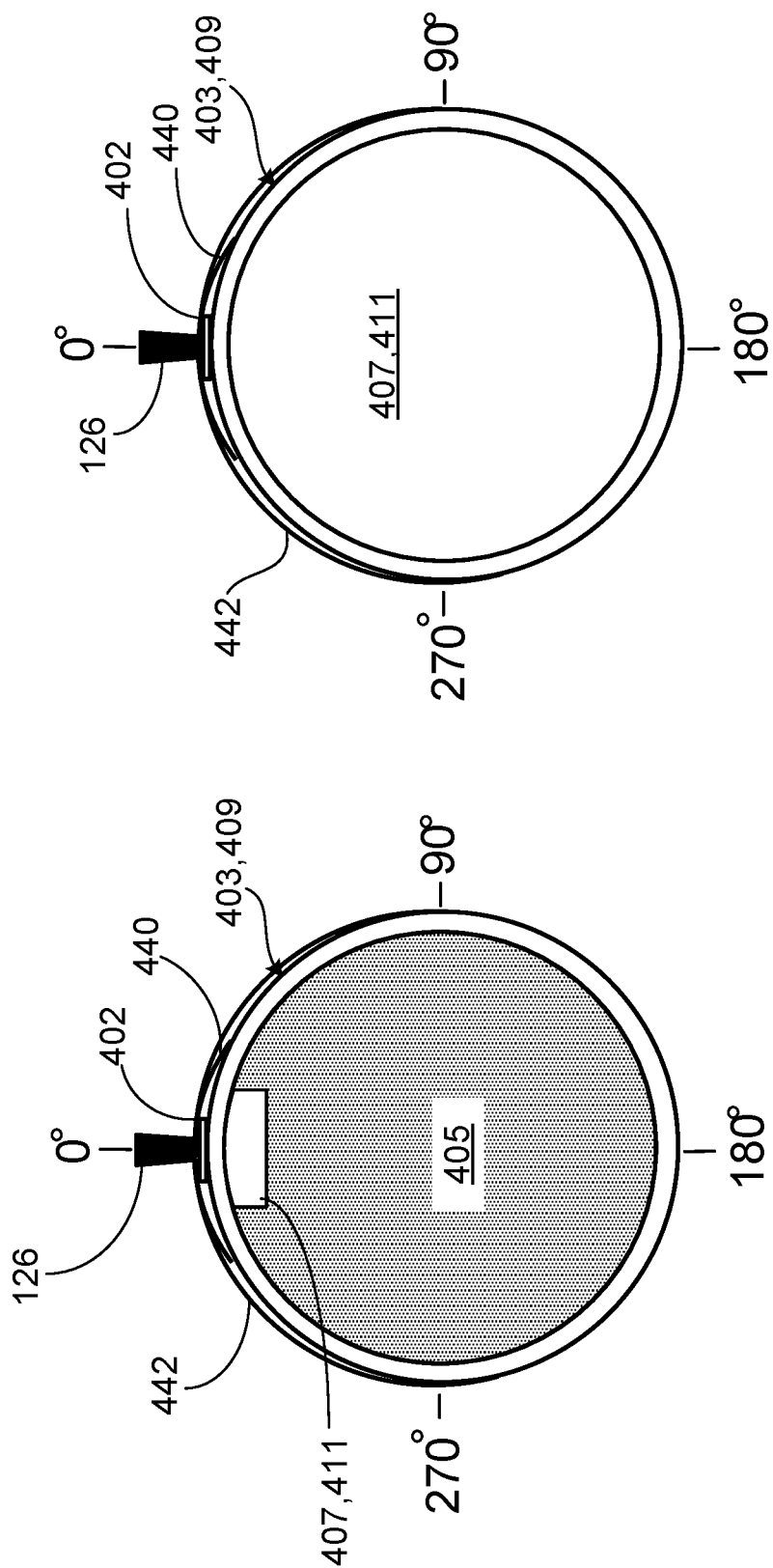

FLOW MANAGEMENT SYSTEMS AND RELATED METHODS FOR OIL AND GAS APPLICATIONS

TECHNICAL FIELD

This disclosure relates to flow management systems utilizing piezoelectric actuation, as well as related methods of managing fluid flows within production conduits.

BACKGROUND

Production pipelines carrying oil and gas can extend for thousands of kilometers between reservoirs and oil and gas terminals. In some cases, a fluid flow of oil and gas may become partially or completely blocked at certain locations along a production pipeline due to sedimentation of various substances along the pipeline, such as gas hydrates and scale. Accumulation of these substances sometimes results from the combination of a relatively high fluid pressure and a relatively low temperature inside of the pipeline and tends to occur in low-lying sections of the pipeline. Accumulation of the substances may occur over a period of minutes to days and may completely block the fluid flow if left unmitigated. Blockage of the fluid flow can result in costly, delayed arrival of the fluid flow to a final destination.

SUMMARY

This disclosure relates to flow management systems designed to mitigate a pliable blockage within a metallic or non-metallic oil and gas production conduit. An example flow management system includes an expandable device that is attachable to a wall of a conduit for compacting a blockage within the conduit to reopen the conduit to fluid flow. The expandable device is adjustable between an expanded configuration and a collapsed configuration in response to a presence of or a lack thereof an electrical current. Accordingly, the flow management system also includes an electric actuator (for example, a power source) for delivering a current to or removing a current from the expandable device to adjust the expandable device between the two configurations. The flow management system also includes an actuation line extending between the electric actuator and the expandable device and a control module for controlling operation of the electric actuator and various other associated components of the flow management system. Depending on certain aspects of the conduit, the expandable device may be attached to an interior wall surface of the conduit or to an exterior wall surface of the conduit.

In one aspect, a flow management system includes an expandable device configured for attachment to a wall surface of a conduit and being adjustable between an expanded configuration and a collapsed configuration, an electric actuator in fluid communication with the expandable device, and a control module. The control module is configured to control the electric actuator to flow a current to the expandable device to expand the expandable device for compacting a flow blockage within the conduit to create a channel adjacent the flow blockage and to terminate a flow of the current to the expandable device to collapse the expandable device for opening the channel to a fluid flow within the conduit.

Embodiments may provide one or more of the following features.

In some embodiments, the expandable device includes an electrosensitive device.

In some embodiments, the expandable device includes a piezoelectric element that is configured to expand to the expanded configuration in response to an internal charge generated by the current.

In some embodiments, the piezoelectric element is configured to contract to the collapsed configuration upon termination of the flow of the current.

In some embodiments, the expandable device includes a piezoceramic material.

In some embodiments, the expandable device includes a corrosion-resistant material.

In some embodiments, the expandable device is an elongate structure.

In some embodiments, the expandable device is configured to extend radially inward with respect to the conduit to compact the flow blockage.

In some embodiments, the expandable device is configured to contract radially outward with respect to the conduit to expose the channel.

In some embodiments, the electric actuator is disposed at a surface above a formation in which the conduit is disposed.

In some embodiments, the electric actuator is disposed at a seabed in which the conduit is disposed.

In some embodiments, the electric actuator is disposed in an autonomous vehicle or is fixedly installed to a generator.

In some embodiments, the flow management system further includes an actuation line that extends from the electric actuator to an electrical connector at the expandable device.

In some embodiments, the actuation line includes an electrical cable.

In some embodiments, the flow management system further includes a flow rate sensor for determining a flow rate of fluid flowing within the conduit.

In some embodiments, the controller is operable to control the electric actuator based on data acquired by the flow rate sensor.

In some embodiments, the flow management system further includes multiple straps for securing the expandable device to the conduit.

In some embodiments, each strap of the multiple straps is adjustable in diameter.

In some embodiments, the multiple straps is distributed along an entire length of the expandable device.

In some embodiments, the flow management system further includes a protective cover arranged along an outer side of the expandable device.

In another aspect, a method of managing a fluid flow within a conduit includes determining a presence of a flow blockage within the conduit, the conduit being equipped with an expandable device, controlling an electric actuator to flow a current to the expandable device to expand the expandable device radially, compacting the flow blockage radially along a length of the expandable device to create a channel adjacent the flow blockage, controlling the electric actuator to terminate a flow of the current to the expandable device to collapse the expandable device radially, and exposing the channel to open the conduit to fluid flow.

Embodiments may provide one or more of the following features.

In some embodiments, the expandable device includes an electrosensitive device.

In some embodiments, the expandable device includes a piezoelectric element.

In some embodiments, the method further includes expanding the expandable device to the expanded configuration in response to an internal charge generated by the current.

In some embodiments, the method further includes contracting the expandable device to the collapsed configuration upon termination of the flow of the current that generated the internal charge.

In some embodiments, the expandable device includes a piezoceramic material.

In some embodiments, the expandable device includes a corrosion-resistant material.

In some embodiments, compacting the flow blockage includes providing direct contact between the expandable device and the flow blockage.

In some embodiments, compacting the flow blockage includes deforming the conduit radially inward.

In some embodiments, collapsing the expandable device includes causing the conduit to deform radially outward to expose the channel.

In some embodiments, the method further includes flowing the current along an actuation line that extends between the electric actuator and an electrical connector at the expandable device.

In some embodiments, the method further includes flowing the current through the expandable device.

In some embodiments, the actuation line includes an electrical cable.

In some embodiments, the method further includes determining a flow rate of fluid flowing through the conduit at a flow rate sensor.

In some embodiments, the method further includes controlling the electric actuator based on data acquired by the flow rate sensor.

In some embodiments, the method further includes securing the expandable device to the conduit with multiple straps.

In some embodiments, the method further includes adjusting each strap of the multiple straps based on a local diameter of the conduit.

In some embodiments, the method further includes distributing the multiple straps along an entire length of the expandable device.

In some embodiments, the method further includes installing a protective cover along an outer side of the expandable device.

In some embodiments, the method further includes installing the expandable device to an exterior surface of the conduit.

The details of one or more embodiments are set forth in the accompanying drawings and description. Other features, aspects, and advantages of the embodiments will become apparent from the description, drawings, and claims.

DESCRIPTION OF DRAWINGS

FIG. 10 is a side perspective view of a flow management system that includes a flow rate sensor.

FIG. 12 is a cross-sectional view of the conduit of FIG. 11, obstructed with a flow blockage and equipped with the expandable device of FIG. 12 in a collapsed configuration.

FIG. 13 is a cross-sectional view of the conduit of FIG. 11, obstructed with the flow blockage and equipped with the expandable device of FIG. 11 in an expanded configuration.

FIG. 14 is a cross-sectional view of the conduit of FIG. 11, partially obstructed with the flow blockage and equipped with the expandable device of FIG. 11 in the collapsed configuration.

FIG. 15 is a cross-sectional view of the conduit of FIG. 11 in a state fully open to fluid flow and equipped with the expandable device of FIG. 11 in the collapsed configuration.

DETAILED DESCRIPTION

Figure 1:
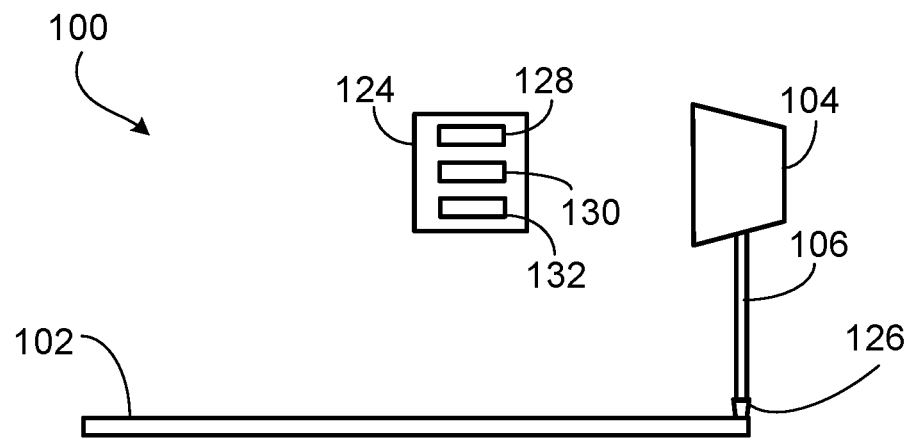
FIG. 1 is a side perspective view of a flow management system.
Figure 2:
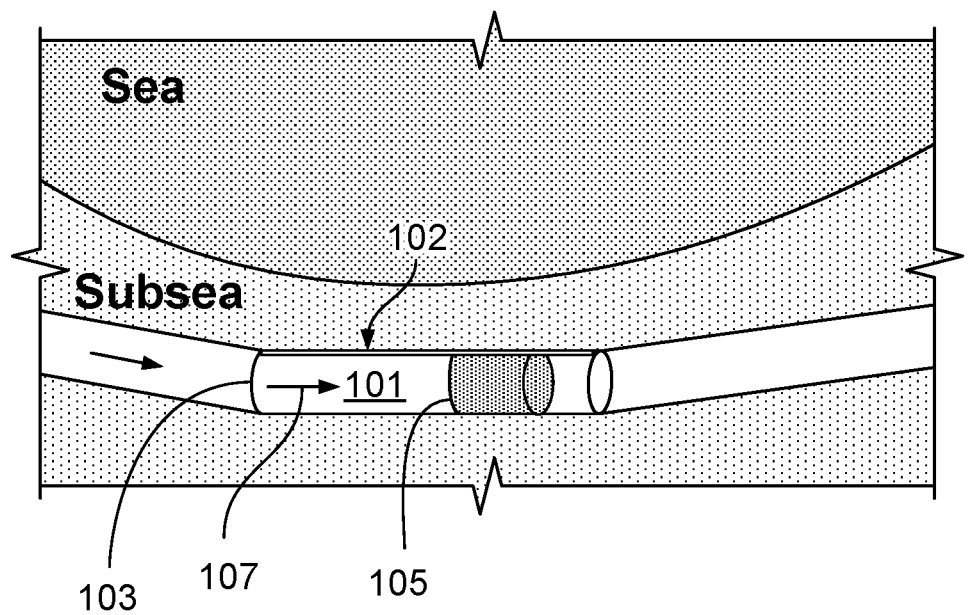
FIG. 2 is a side perspective view of a deployed conduit, obstructed with a flow blockage and equipped with an expandable device of the flow management system of FIG. 1 along an interior surface of the conduit.
Figure 3:
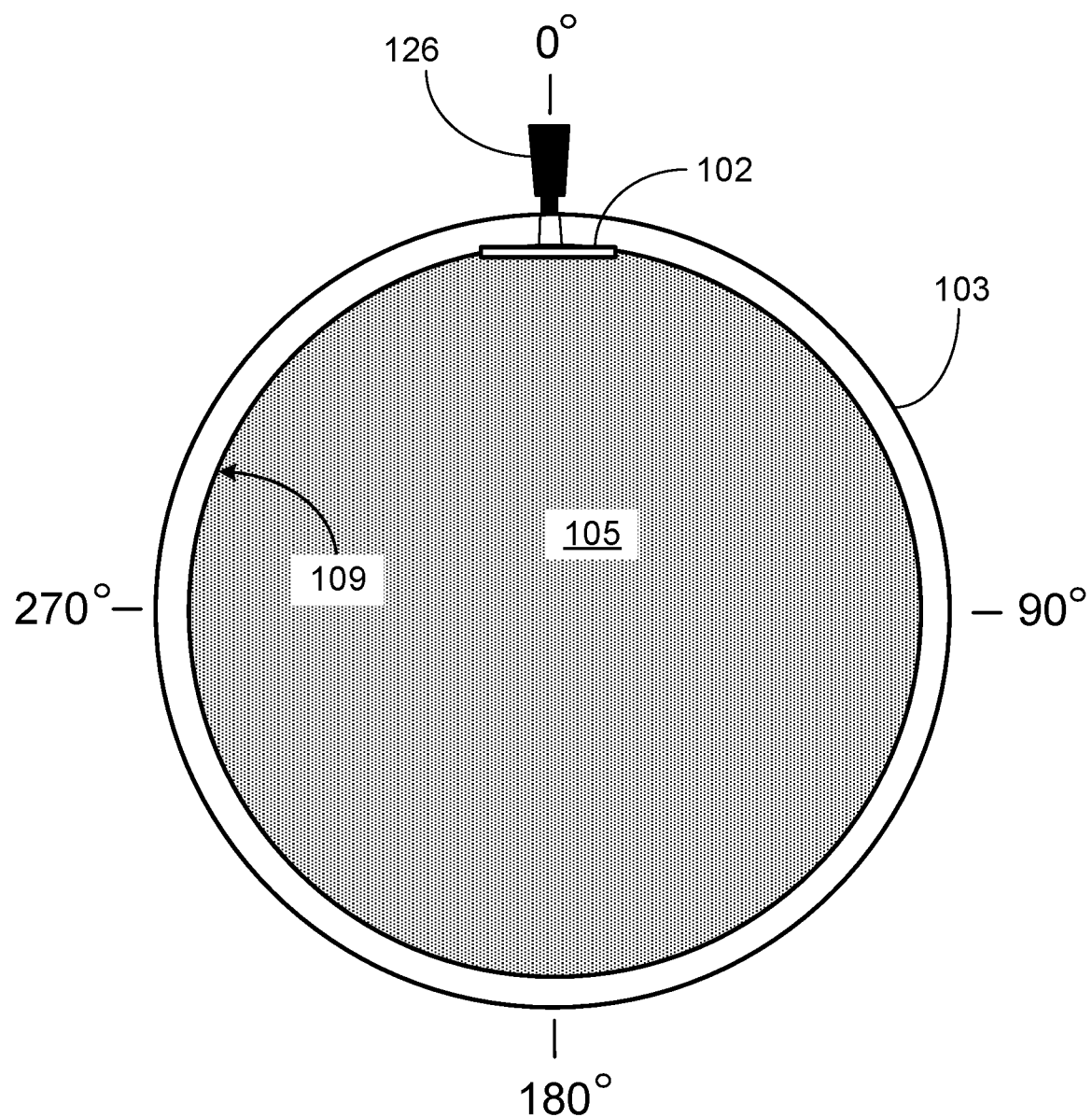
FIG. 3 is a cross-sectional view of the conduit of FIG. 2, obstructed with the flow blockage and equipped with the expandable device of FIG. 1 in a collapsed configuration.

Referring to FIGS. 1-3, a flow management system 100 is designed to reopen a flow channel 101 of a conduit 103 to fluid flow amidst an accumulation of substances that form a blockage 105 within the conduit 103. In some examples, the blockage 105 may be a compliant obstruction formed from one or more substances, such as a gas hydrate, an oil hydrate, sand, scale, corrosion layers, or several other solid sediments that may accumulate in oil and gas conduits. In the example of FIG. 2, the conduit 103 is a rigid pipe segment formed of steel or a non-metallic plastic or is a flexible pipe segment (for example, a flexible transfer hose) formed of one or more materials, such as polytetrafluoroethylene (PTFE), corrugated nitrile butadiene rubber (NBR), and corrugated polyvinyl chloride (PVC). The conduit 103 carries a flow of fluid 107 that includes one or both of oil and gas. In some embodiments, the conduit 103 is a segment of a subsea production pipeline, as shown in FIG. 2. In other embodiments, the conduit 103 is a segment of an onshore production pipeline.

Referring particularly to FIG. 1, the flow management system 100 includes an expandable device 102 for compacting the blockage 105 to reopen the flow channel 101 to fluid flow, an electric actuator 104 for activating and deactivating the expandable device 102, and an actuation line 106 extending between the electric actuator 104 and the expandable device 102 expandable device. The flow management system 100 further includes a control module 124 located at the surface for controlling operation of the electric actuator 104 and various components of the flow management system 100. The control module 124 includes hardware 128, one or more processors 130 implemented on the hardware 128, and a user interface 132.

The expandable device 102 has a thin profile and extends along a length of the conduit 103. In the example of FIG. 2, the expandable device 102 is preinstalled to an inner surface 109 of the conduit 103. For example, the expandable device 102 is installed at an axial location along the conduit 103 that is predicted to be vulnerable to blockage by multiphase flow assurance hydraulic analyses. Such locations are often at low-lying positions where the effect of gravity tends to promote accumulation of substances or at positions that experience low fluid velocity such that low fluid flow shear would tend to result in an accumulation of substances along the conduit 103. Advantageously, interior placement of the expandable device 102 along the inner surface 109 does not interfere with pipeline maintenance when performing scraping or utilizing intelligent inspection devices, such as magnetic flux leakage devices.

The expandable device 102 may generally be installed in a pipe of any configuration (for example, horizontal or vertical) and any shape (for example, straight, conical, or another shape). In some examples, as shown in FIG. 3, the expandable device 102 is installed at a circumferential position between about 315 degrees (for example, −45 degrees) and about 45 degrees with respect to a reference position of 0 degrees (for example, a twelve o'clock position) or more particularly at a circumferential position between about 350 degrees (for example, −10 degrees) and about 10 degrees with respect to the reference position. Installation of the expandable device 102 within such ranges in proximity to the top, twelve o'clock circumferential position takes advantage of the effect of gravity, which promotes settling of any blockage debris away from the expandable device 102 once the blockage 105 has been compacted. In other examples, the expandable device 102 may be installed at any circumferential position between 0 degrees and 360 degrees around a circumference of the conduit 103.

Figure 4:
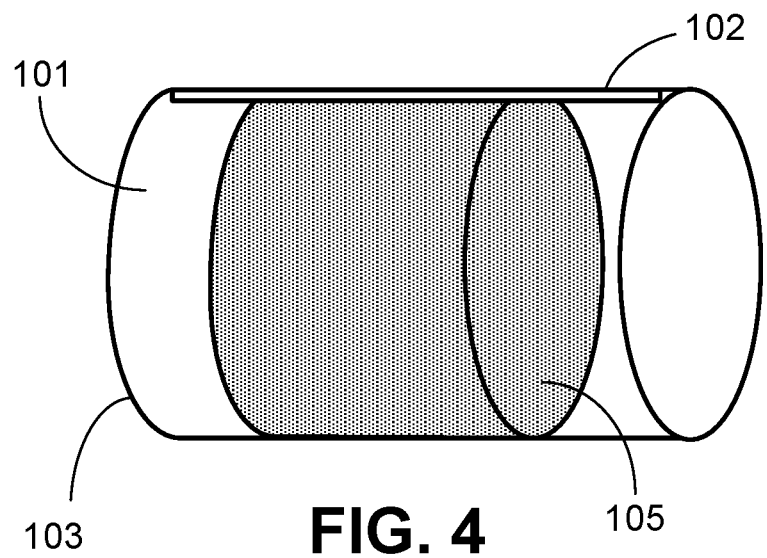
FIG. 4 is a side perspective view of the conduit of FIG. 2, obstructed with the flow blockage and equipped with the expandable device of FIG. 1 in an expanded configuration.

Referring to FIGS. 3 and 4, the expandable device 102 is provided as a piezoelectric element that can reversibly expand in response to application of an electrical current (for example, a direct current) or contract upon termination of such electrical current. For example, the expandable device 102 is an electrosensitive device that can be electrically activated by a current to expand into an expanded configuration (for example, an extended configuration), as shown in FIG. 4, and can be electrically deactivated to retract into a collapsed configuration (for example, a reference configuration), as shown in FIG. 3. In the example of FIGS. 3 and 4, the expandable device 102 has a generally linear cross-sectional shape in the collapsed configuration and a generally rectangular cross-sectional shape in the expanded configuration. However, in other embodiments, an expandable device that is otherwise substantially similar in construction and function to the expandable device 102 may have different cross-sectional shapes in the expanded and collapsed configurations.

The expandable device 102 typically has a length that falls in a range of about 5 meters (m) to about 50 m, a height in the collapsed configuration that falls a range of about 0.1 centimeters (cm) to about 1 cm, a height in the expanded configuration that falls a range of about 0.11 cm to about 1.5 cm, and a width (for example, in the reference configuration) that falls in a range of about 0.5 cm to about 5 cm. The expandable device 102 is made of one or more piezoelectric materials that can deform into a mechanically stressed state (for example, to achieve the expanded configuration) in response to an internal electric charge generated by an electrical current applied to the expandable device 102. Such materials can also mechanically withstand multiple actuation cycles and temperature and pressure spikes within the flow channel 101 over a period of 25 or more years. Example materials from which the expandable device 102 may be made include a corrosion-resistant solid of sufficient hardness, such as a piezoceramic or a reinforced or shielded electroactive polymer such as polyvinylidene fluoride (PVDF).

Referring again to FIG. 1, the actuation line 106 is an electrical cable that extends from the electric actuator 104 to an electrical connector 126 at an end of the expandable device 102. In some embodiments, the actuation line 106 may extend a length that falls in a range of about 5 m to about 50 m from the electric actuator 104 to an end of the expandable device 102.

The actuation medium for actuating the expandable device 102 is an electrical current that flows from the actuation line 106 into and through the expandable device 102. Accordingly, the electric actuator 104 is a power source (for example, a current generator) that electrically operates the expandable device 102 by delivering a direct current (DC) to the expandable device 102 along the actuation line 106 or by terminating a flow of a current along the actuation line 106. The electric actuator 104 is typically located at the surface. However, in other embodiments, the electric actuator 104 may be located subsea if the electric actuator 104 is operated by a turbine or an impeller driven by fluid flow through a pipe connected to a motive source, such as a pump at a service truck or a service vessel. In some embodiments, the electric actuator 104 may be disposed in an autonomous vehicle (for example, a drone, an autonomous underwater vehicle, or another type of remotely operated vehicle) or permanently, fixedly installed as part of a generator (for example, a solar, wind, or diesel generator).

Figure 5:
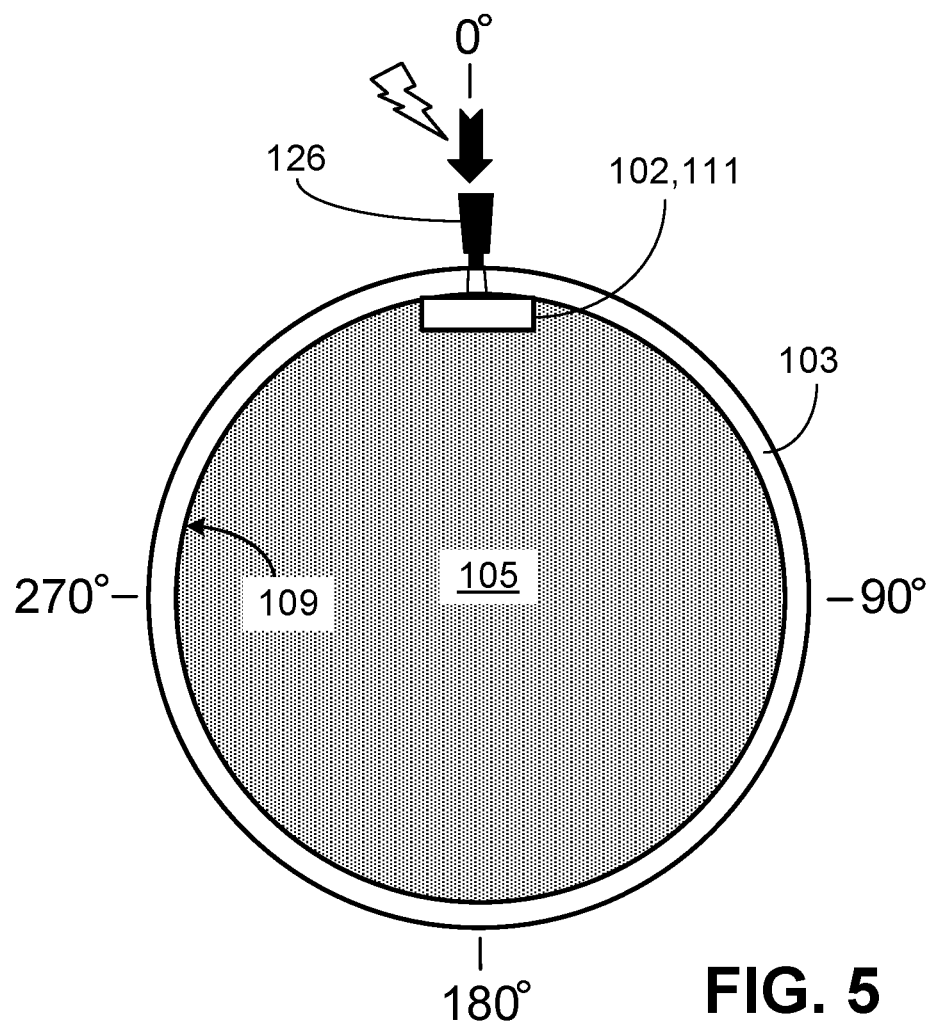
FIG. 5 is a cross-sectional view of the conduit of FIG. 2, obstructed with the flow blockage and equipped with the expandable device of FIG. 1 in the expanded configuration.

Referring to FIGS. 4 and 5, the control module 124 is operable to control the electric actuator 104 to deliver a direct current to the expandable device 102 that causes the expandable device 102 to deform into an expanded configuration. The expandable device 102 will remain in the expanded configuration for as long as the current flows to the expandable device 102. During expansion, the expandable device 102 exerts a radial force to directly compact the blockage 105 in the conduit 103. Such compaction shatters the blockage 105 (for example, turning the blockage 105 into particles of debris) and accordingly creates an axial channel 111 within or adjacent the blockage 105.

Figure 7:
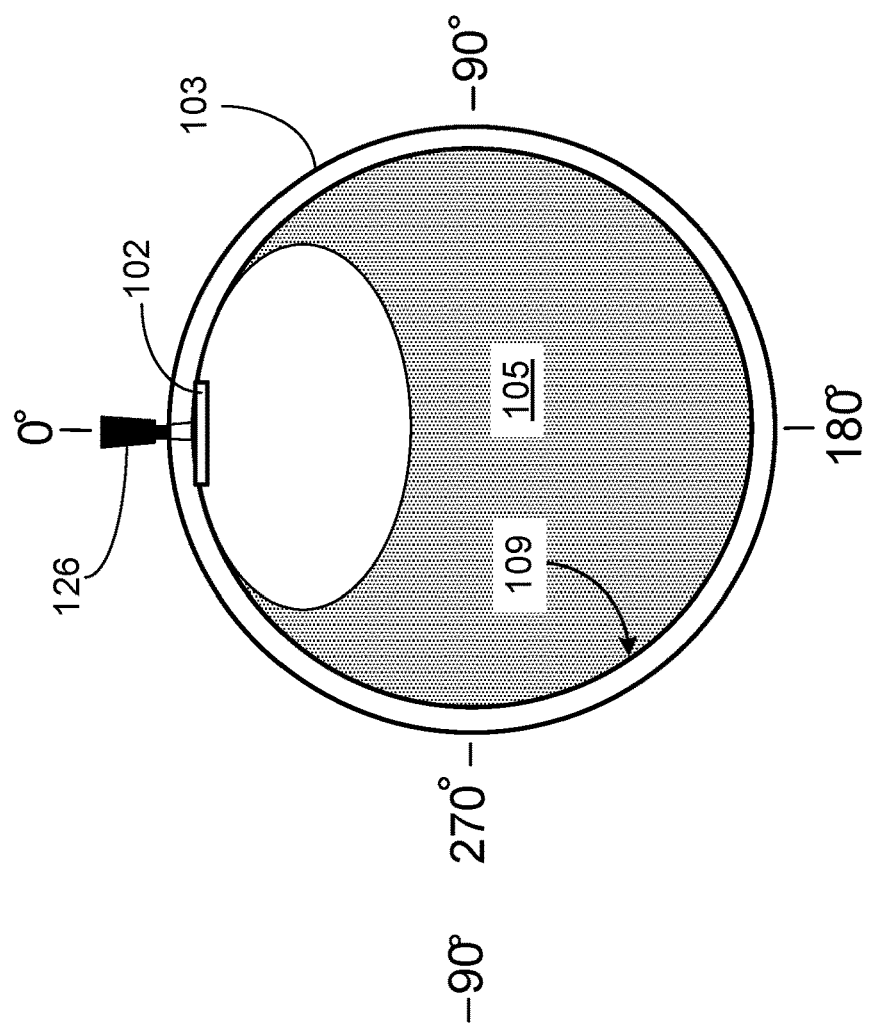
FIG. 7 is a cross-sectional view of the conduit of FIG. 2, partially, but less obstructed with the flow blockage and equipped with the expandable device of FIG. 1 in the collapsed configuration.
Figure 6:
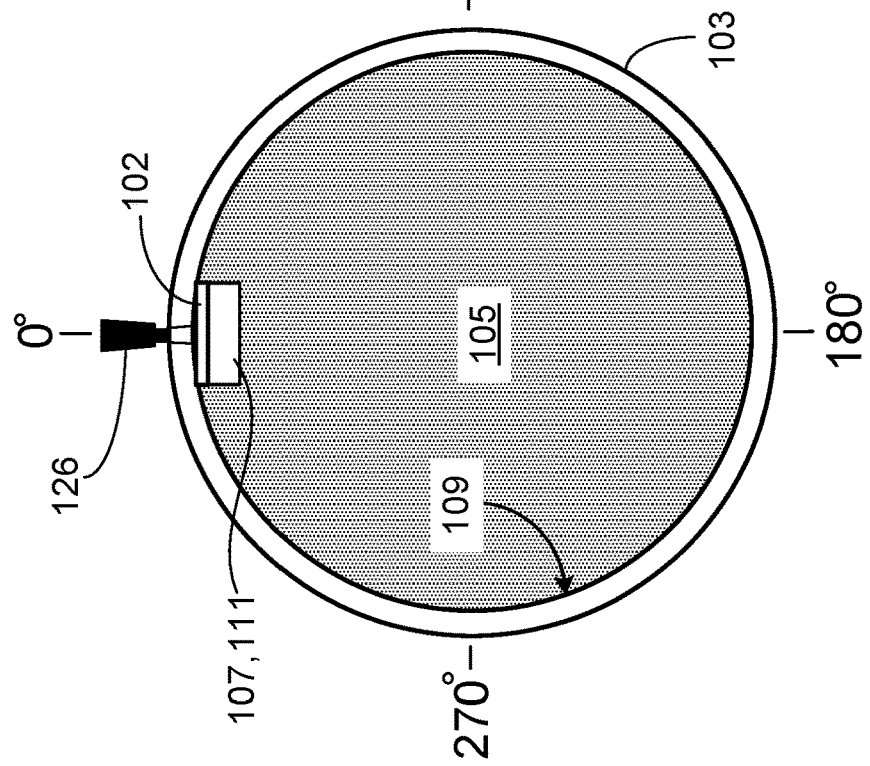
FIG. 6 is a cross-sectional view of the conduit of FIG. 2, partially obstructed with the flow blockage and equipped with the expandable device of FIG. 1 in the collapsed configuration.
Figure 8:
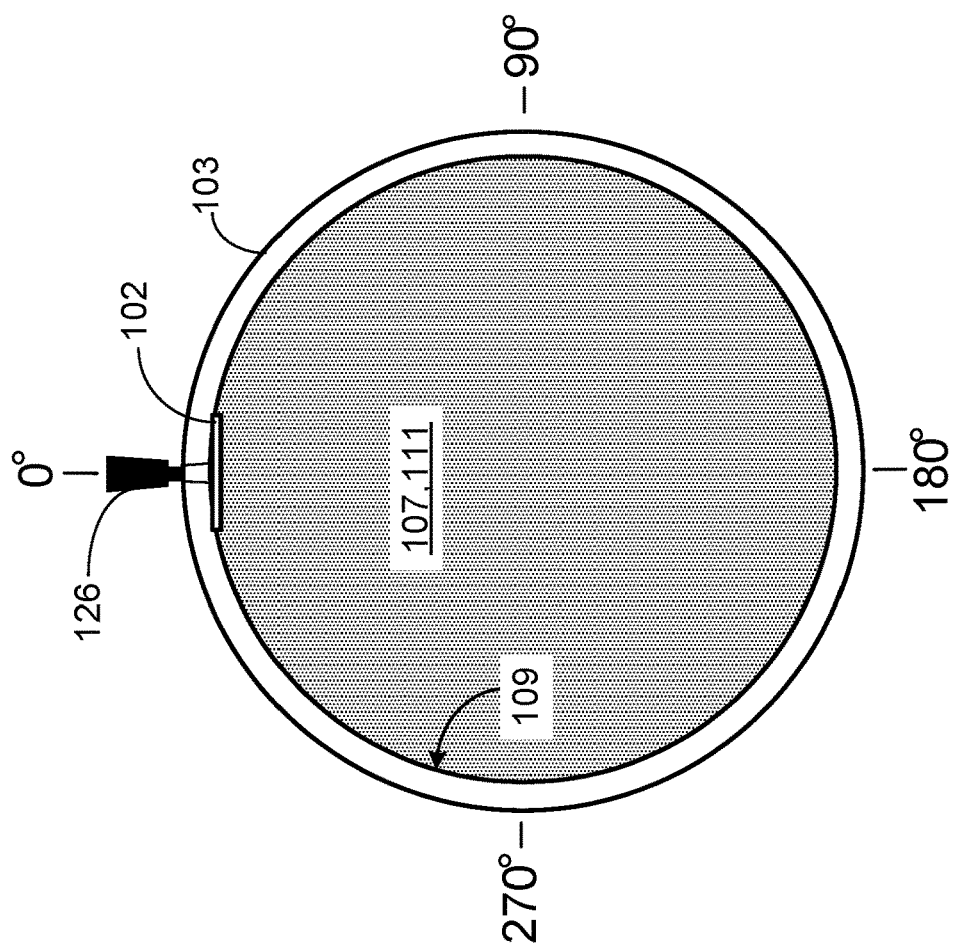
FIG. 8 is a cross-sectional view of the conduit of FIG. 2 in a state fully open to fluid flow and equipped with the expandable device of FIG. 1 in the collapsed configuration.

Referring to FIG. 6, the control module 124 is further operable to control the electric actuator 104 to terminate the current to cause the expandable device 102 to revert back to the collapsed configuration, thereby opening the channel 111 to flow of the fluid 107 and accordingly resulting in depressurization of the fluid 107. With flow of the fluid 107 reestablished in the conduit 103, additional blockage remediation efforts can be carried out, such as circulating a solvent through the conduit 103 or deploying a heating means (for example, one or more of a chemical, electrical, and mechanical heating means) to the conduit 103. Referring to FIGS. 7 and 8, flow of the fluid 107 gradually washes out the blockage 105 and enlarges the channel 111 until the conduit 103 has been substantially cleared of the blockage 105 to permit free, unobstructed flow of the fluid 107.

During a production operation, an operator may observe a change in the flow rate of the fluid 107 or a change in a fluid pressure drop across the conduit 103. If the operator determines that such changes are due to a blockage 105, then the operator inputs an instruction at the user interface 132 to activate (for example, energize) the electric actuator 104. The control module 124 controls the electric actuator 104 to supply a direct current to the expandable device 102. The expandable device 102 accordingly extends radially inward (for example, with respect to the conduit 103) and compacts the blockage 105 to create a channel 111 within or adjacent the blockage 105.

The control module 124 subsequently deactivates (for example, de-energizes) the electric actuator 104 to cease the current flow to return the expandable device 102 to the collapsed configuration. Returning the expandable device 102 to the collapsed configuration opens the channel 111 to fluid flow. Additional blockage remediation efforts are deployed to the channel 111, and normal production is resumed at the conduit 103. In some examples, actuation of the expandable device 102 to destruct even partial blockages 105 in a vicinity of the expandable device 102 can prevent or otherwise mitigate potential clogging of the conduit 103. Utilization of the flow management system 100 advantageously prevents the need to remediate blockages using conventional devices, such as electrically or hydraulically actuated depressurization pumps, which can cost in the tens of millions of dollars. Accordingly, the flow management system 100 provides a cost-effective solution for mitigating blockages in production pipelines in onshore, subsea, and arctic environments.

In some embodiments, the control module 124 automatically controls the electric actuator 104 to supply a current to the expandable device 102 without input from an operator, such as when a temperature inside of the conduit 103 approaches a freezing temperature. In some embodiments, the control module 124 is additionally programmed to operate in conjunction with online advisory tools or machine learning flow assurance tools (such as a pipeline optimization monitoring advisory solution) that can predict when a blockage is likely to occur and when to actuate the expandable device 102.

Figure 9:
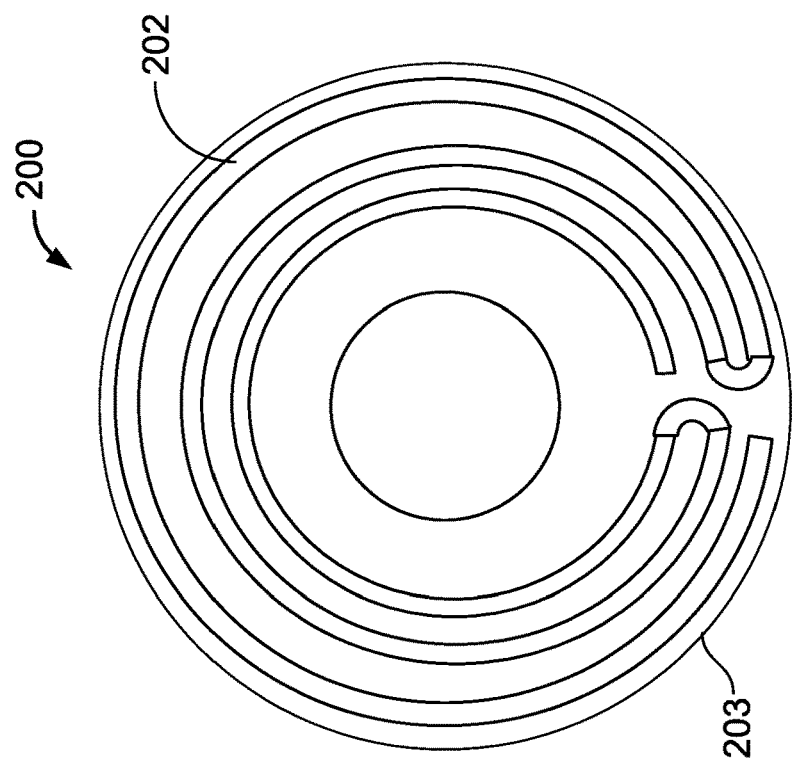
FIG. 9 is a cross-sectional view of a conduit equipped with a circumferential expandable device of a flow management system.

While the flow management system 100 has been described and illustrated with respect to certain dimensions, sizes, shapes, arrangements, materials, and methods, in some embodiments, a flow management system that is otherwise substantially similar in construction and function to the flow management system 100 may include one or more different dimensions, sizes, shapes, arrangements, configurations, and materials or may be utilized according to different methods. For example, while the flow management system 100 has been described and illustrated as including an expandable device 102 that extends around only a fraction of the circumference of the conduit 103, in some embodiments, a flow management system may include an expandable device that has a wavy, sinusoidal, or otherwise spiral configuration that extends around an entire circumference of a conduit. FIG. 9 illustrates a perspective view of such an expandable device 202 (for example, a shape-expandable device) of a flow management system 200 installed within a conduit 203. The flow management system 200 is otherwise substantially similar in construction and function to the flow management system 100 and accordingly includes the electric actuator 104, the actuation line 106, and the control module 124, and may be used in the manner described above with respect to use of the flow management system 100. Extending around the entire circumference of the conduit 203, the expandable device 202 is extendible radially inward to squeeze a blockage to compact and destruct the blockage.

In some embodiments, a flow management system 300 may additionally or alternatively include a flow sensor 336, as shown in FIG. 10. The flow sensor 336 may be located at an outlet end of a conduit such that an upstream blockage would result in a reduced or zero flow rate detected at the flow sensor 336. The flow management system 300 is otherwise substantially similar in construction and function to the flow management system 100 and accordingly includes the expandable device 102, the electric actuator 104, the actuation line 106, and the control module 124. The flow sensor 336 is a differential pressure (for example, diaphragm-type) flow sensor that measures actual flow rates or predicts expected flow rates of a fluid and communicates the flow rates to the control module 124. Such data allows the control module 124 to control actuation of the expandable device 102 automatically without input from an operator concerning a flow behavior of the fluid. For example, if a change in the flow rate of the fluid or a change in a fluid pressure drop across the conduit is detected by the flow sensor 336, then the control module 124 can actuate the expandable device 102 to compact a blockage, as discussed above with respect to the flow management system 100. Accurate determination of the temperature of the fluid may be particularly important when operating the flow management system 300 with the flow sensor 336, as the temperature can change significantly, seasonally.

Figure 11:
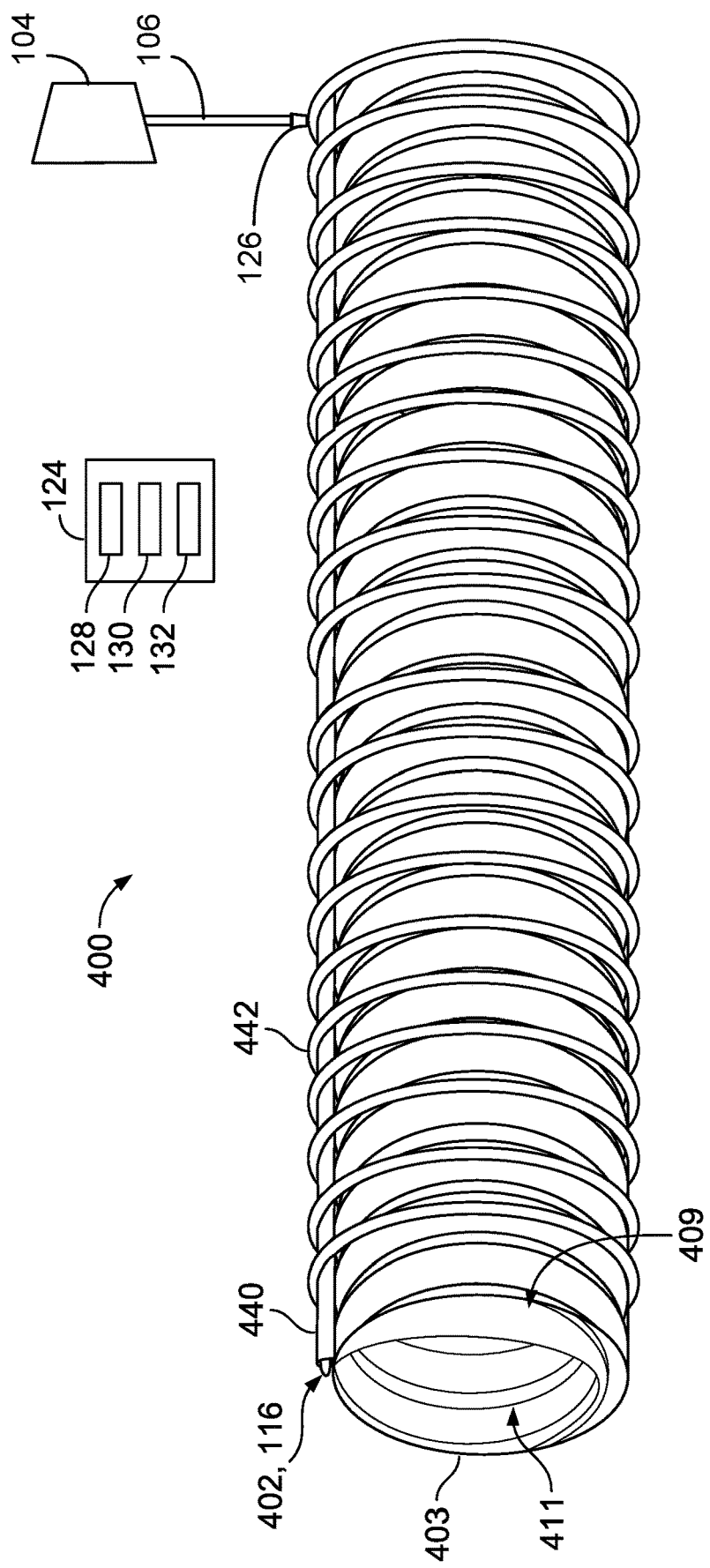
FIG. 11 is a perspective view of a flow management system including an expandable device that is installed to an exterior surface of a conduit.

While the flow management system 100 has been described and illustrated as including an expandable device 102 that is installed along the inner surface 109 of the conduit 103, in some embodiments, a flow management system may include an expandable device that is installed to an exterior surface of a flexible conduit. FIG. 11 illustrates such a flow management system 400, which includes an expandable device 402 that is installed to an exterior surface 409 of a flexible conduit 403. The conduit 403 is a flexible pipe segment (for example, a flexible transfer hose) formed of a plastic tubular shell that is reinforced with a spiral-shaped metal frame. The conduit 403 may be a segment of an onshore production pipeline or a segment of a subsea production pipeline carrying a flow of fluid 407 that includes one or both of oil and gas.

Referring to FIGS. 11 and 12, the flow management system 400 also includes multiple rigid straps 442 (for example, hoops or braces) that securely hold the expandable device 402 in place against the conduit 403 and an elongate cover 440 that transmits strain from the expandable device 402 to the blocked conduit 403. The flow management system 400 is otherwise substantially similar in construction and function to the flow management system 100 and accordingly includes the electric actuator 104, the actuation line 106, and the control module 124.

In some examples, the expandable device 402 may be preinstalled to the conduit 403 at an axial location along the conduit 403 that is predicted to be vulnerable to blockage by multiphase flow assurance hydraulic analyses. In other examples, the expandable device 402 may be retrofitted to the conduit 403 before a blockage 405 has developed in the conduit 403, while the conduit 403 is of a relatively light weight and easy to lift. In yet still other examples, the expandable device 403 may be retrofitted to the conduit 403 after a blockage 405 has developed in the conduit 403 using heavier-duty equipment.

For a retrofit installation of the expandable device 402 to the conduit 403, the conduit 403 is accessed and lifted from the surface (for example, the seabed or the ground) with lifting equipment. The expandable device 402 is positioned against the conduit 403, and the straps 442 are sequentially applied and tightened around the expandable device 402 and the conduit 403 along a length of the expandable device 402. Such installation may be automated by rolling the expandable device 402 and the straps 442 off of a spool and onto the conduit 403. Advantageously, external placement of the expandable device 402 does not interfere with pipeline maintenance when performing scraping or utilizing wellwork wireline tools.

Since the expandable device 402 is installed to the exterior surface 409 and accordingly not exposed to a corrosive interior environment of the conduit 403, the expandable device 402 may not include materials that exhibit corrosion resistance. For example, the expandable device 402 may be made of one or more materials, such as PVDF. The expandable device 402 is otherwise substantially similar in construction and function to the expandable device 102. Because the conduit 403 is flexible, radial forces exerted by the expandable device 402 during expansion deforms the conduit 403 (for example, pushes the conduit 403 radially inward) to cause the conduit 403 to compact a blockage 405 within the conduit 403 and create a channel 411, as shown in FIG. 13. In this manner, the expandable device 402 does not contact with the blockage 405 directly and thus indirectly compacts the blockage 405.

The straps 442 are distributed along an entire length of the expandable device 402 and the conduit 403 and may be made of one or more materials, such as PVDF. In the example of FIG. 11, each strap 442 has a width that falls in a range of about 0.5 cm to about 5 cm and a thickness that falls in a range of about 0.1 cm to about 0.5 cm. Installation of several straps 442 ensures that radial pressure applied by the expandable device 402 is completely transferred to the conduit 403 along an entire length of the expandable device 402. Furthermore, using multiple adjustable straps 442 that are distributed along the length of the expandable device 402 allows for installation against a conduit of variable diameter. In contrast, utilizing a single, long strap (for example, a tubular sleeve) may be less effective at ensuring complete transfer of actuation energy in cases where a conduit has a variable diameter.

In some embodiments, the flow management system 400 may alternatively or additionally include rigid elongate straps oriented parallel to a central axis of the conduit 403. Such elongate straps may be disposed between the expandable device 402 and the multiple straps 442 and between the conduit 403 and the multiple straps 442 to further secure the expandable device 402 and ensure complete transfer of the actuation energy to the conduit 403. Such elongate straps may be distributed about a circumference of the conduit 403 in a manner that provides full coverage of the exterior surface 409 of the conduit 403 or in a manner that defines gaps between the elongate straps.

Referring to FIG. 14, the control module 124 can further control the electric actuator 104 to subsequently terminate the current flow to the expandable device 402 to cause the expandable device 102 to the contract to the collapsed configuration, thereby allowing the conduit 403 to recoil radially outward. Deformation of the conduit 403 to its initial shape exposes the channel 411 to open the conduit 403 to flow of the fluid 407 and accordingly results in depressurization of the fluid 407. With flow of the fluid 407 reestablished in the conduit 403, additional blockage remediation efforts can be carried out at the conduit 403. Referring to FIG. 15, flow of the fluid 107 gradually washes out the blockage 405 and enlarges the channel 411 until the conduit 403 has been substantially cleared of the blockage 405 to permit free, unobstructed flow of the fluid 407.

Figure 16:
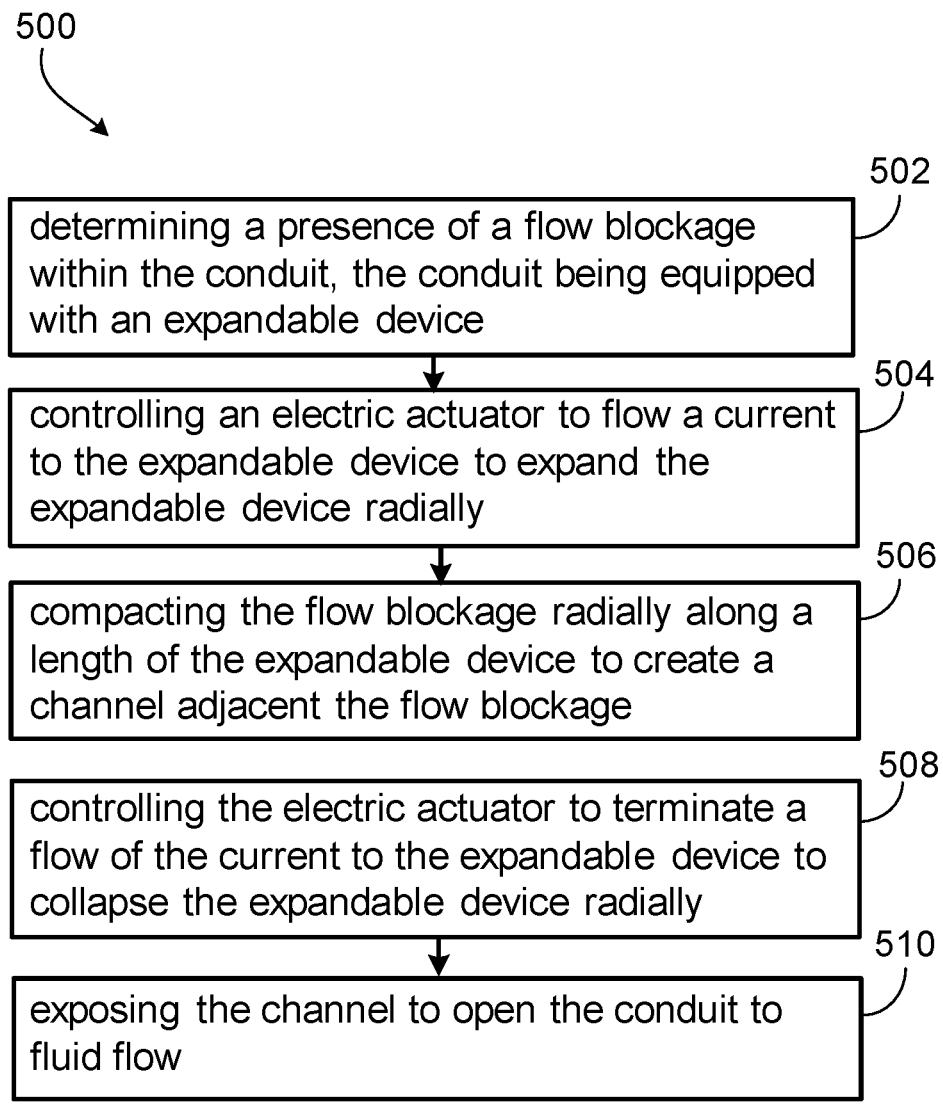
FIG. 16 is a flow chart illustrating an example method of managing a fluid flow within a conduit using any of the flow management systems of FIG. 1, 9, 10, or 11.

FIG. 16 is a flow chart illustrating an example method 500 of managing a fluid flow within a conduit (for example, the conduit 103, 203, 403). In some embodiments, the method 500 includes a step 502 for determining a presence of a flow blockage (for example, the blockage 105, 405) within the conduit, the conduit being equipped with an expandable device (for example, the expandable device 102, 202, 402). In some embodiments, the method 500 further includes a step 504 for controlling an electric actuator (for example, the electric actuator 106) to flow a current to the expandable device to expand the expandable device radially. In some embodiments, the method 500 further includes a step 506 for compacting the flow blockage radially along a length of the expandable device to create a channel (for example, the channel 111, 411) adjacent the flow blockage. In some embodiments, the method 500 further includes a step 508 for controlling the electric actuator to terminate a flow of the current to the expandable device to collapse the expandable device radially. In some embodiments, the method 500 further includes a step 510 for exposing the channel to open the conduit to fluid flow.

While the example scenarios mentioned above have been described and illustrated with respect to installation of a single expandable device 102, 202, 402 along a conduit, in some implementations, multiple expandable devices 102, 202, 402 may be installed to a conduit as necessary to mitigate clogging of the conduit.

While the expandable devices 102, 202, 402 have been described and illustrated as part of flow management systems 100, 200, 300, 400, in some embodiments, an expandable device that is generally similar in configuration and function to the any of the expandable devices 102, 202, 402 may be deployed in other contexts that are unrelated to petroleum applications, such as biomedical applications (for example, inside of a blood vessel to remove a clog in the vessel).

Other embodiments are also within the scope of the following claims.

What is claimed is:

1. A method of managing a fluid flow within a conduit, the method comprising:
   determining a presence of a flow blockage within the conduit, the conduit being equipped with an expandable device;
   controlling an electric actuator to flow a current to the expandable device to expand the expandable device radially;
   compacting the flow blockage radially along a length of the expandable device to create a channel adjacent the flow blockage;
   controlling the electric actuator to terminate a flow of the current to the expandable device to collapse the expandable device radially; and
   exposing the channel to open the conduit to fluid flow.

2. The method of claim 1, wherein the expandable device comprises an electrosensitive device.

3. The method of claim 1, wherein the expandable device comprises a piezoelectric element.

4. The method of claim 1, wherein the expandable device comprises a corrosion-resistant material.

5. The method of claim 1, wherein compacting the flow blockage comprises providing direct contact between the expandable device and the flow blockage.

6. The method of claim 1, wherein compacting the flow blockage comprises deforming the conduit radially inward.

7. The method of claim 1, further comprising flowing the current along an actuation line that extends between the electric actuator and an electrical connector at the expandable device.

8. The method of claim 1, further comprising determining a flow rate of fluid flowing through the conduit at a flow rate sensor.

9. The method of claim 1, further comprising securing the expandable device to the conduit with a plurality of straps.

10. The method of claim 1, further comprising installing the expandable device to an exterior surface of the conduit.

11. The method of claim 3, further comprising expanding the expandable device to an expanded configuration in response to an internal charge generated by the current.

12. The method of claim 3, wherein the expandable device comprises a piezoceramic material.

13. The method of claim 6, wherein collapsing the expandable device comprises causing the conduit to deform radially outward to expose the channel.

14. The method of claim 7, further comprising flowing the current through the expandable device.

15. The method of claim 7, wherein the actuation line comprises an electrical cable.

16. The method of claim 8, further comprising controlling the electric actuator based on data acquired by the flow rate sensor.

17. The method of claim 9, further comprising adjusting each strap of the plurality of straps based on a local diameter of the conduit.

18. The method of claim 9, further comprising distributing the plurality of straps along an entire length of the expandable device.

19. The method of claim 9, further comprising installing a protective cover along an outer side of the expandable device.

20. The method of claim 11, further comprising contracting the expandable device to a collapsed configuration upon termination of the flow of the current that generated the internal charge.

* * * * *